(12) United States Patent
Jensen et al.

(10) Patent No.: US 6,638,623 B2
(45) Date of Patent: Oct. 28, 2003

(54) PH ADJUSTMENT OF A STRENGTHENING MELT FOR USE IN STRENGTHENING GLASS SUBSTRATES

(75) Inventors: Terry Lee Jensen, Rochester, MN (US); John William Marier, Byron, MN (US); Rick Allan Sprague, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/024,693

(22) Filed: Dec. 18, 2001

(65) Prior Publication Data
US 2003/0110802 A1 Jun. 19, 2003

(51) Int. Cl.$^7$ .................... B05D 1/18; B32B 17/00; C03C 17/00
(52) U.S. Cl. .................... 428/410; 428/426; 427/8; 427/58; 427/431; 427/443.2; 65/30.14
(58) Field of Search ............... 427/431, 443.2, 427/8, 58; 428/410, 426; 65/30.14

(56) References Cited

U.S. PATENT DOCUMENTS

| | | | | |
|---|---|---|---|---|
| 3,529,946 A | * | 9/1970 | Fischer et al. ............. | 65/30.14 |
| 3,773,489 A | * | 11/1973 | Forker et al. ............. | 65/30.14 |
| 4,803,106 A | | 2/1989 | Lenhart et al. ............. | 428/64 |
| 5,232,481 A | * | 8/1993 | Johnston et al. ........... | 65/30.13 |
| 5,733,622 A | * | 3/1998 | Starcke et al. ............. | 428/64.1 |
| 6,114,039 A | | 9/2000 | Rifqi ...................... | 428/410 |

* cited by examiner

Primary Examiner—Michael Barr
(74) Attorney, Agent, or Firm—Matthew J. Bussan; Leslie J. Payne

(57) ABSTRACT

A method of adjusting the pH of a strengthening melt for use in strengthening glass substrates, e.g., glass disk substrates for use in data storage devices. A non-particle-forming acid is added to the strengthening melt to lower the pH of the strengthening melt to ≦8. The acid is added while the strengthening melt is in a molten state and selected to avoid particle formation. Nitric acid, for example, is non-particle-forming with respect to nitrate based strengthening melts such as potassium nitrate and/or sodium nitrate. A base, e.g., sodium hydroxide, may be added if the pH of the strengthening melt falls below 5. Strengthening melts are subject to pH shift that can cause glass substrates strengthened therein to etch, creating pits on the substrate surface. Glass disk substrates treated in the pH adjusted strengthening melt are essentially free from such pits, as well as contamination caused by particle formation.

20 Claims, 3 Drawing Sheets

PH ADJUSTMENT OF A STRENGTHENING MELT FOR USE IN STRENGTHENING GLASS SUBSTRATES

FIELD OF THE INVENTION

The present invention relates in general to chemical strengthening of glass substrates. More particularly, the present invention relates to a method of adjusting the pH of a strengthening melt for use in strengthening glass substrates, such as glass disk substrates for use in data storage devices.

BACKGROUND

A typical data storage device includes a medium for storing data, typically in magnetic, magneto-optical or optical form, and a transducer used to write and read data respectively to and from the medium. A disk drive data storage device, for example, includes one or more data storage disks coaxially mounted on a hub of a spindle motor. The spindle motor rotates the data storage disks at speeds typically on the order of several thousand or more revolutions-per-minute. Digital information, representing various types of data, is typically written to and read from the data storage disks by one or more transducers, or read/write heads, which are mounted to an actuator assembly and passed over the surface of the rapidly rotating disks.

In a typical magnetic disk drive, for example, data is stored on a magnetic layer coated on a disk substrate. Several characteristics of disk substrates significantly affect the areal density of a disk drive. One such characteristic that significantly affects the areal density of a disk drive is the uniformity of the surface of the disk substrate, i.e., the absence of substrate surface defects. It is generally recognized that minimizing the flyheight, i.e., the clearance distance between the read/write head and the surface of a data storage disk, generally provides for increased areal densities. It is also recognized in the art, however, that the smoothness of the surface of a data storage disk becomes a critical factor and design constraint when attempting to minimize the flyheight. A significant decrease in flyheight provided by the use of data storage disks having highly uniform recording surfaces can advantageously result in increased transducer readback sensitivity and increased areal density of the disk drive. The uniformity of disk substrate surfaces affects the uniformity of the recording surfaces because the layers sputtered onto the disk substrate, such as the magnetic layer, replicate any irregular surface morphology of the disk substrate.

Conventionally, disk substrates have been based upon aluminum, such as NiP coated Al/Mg alloy substrates. Coating the aluminum magnesium alloy with a nickel-phosphorus plate provides a harder exterior surface which allows the disk substrate to be polished and superfinished. Typically, the Al/Mg—NiP substrate is superfinished to a smooth finish with a colloidal slurry, e.g., a pH adjusted aqueous slurry containing colloidal silica and/or colloidal alumina particles and an etching agent such as aluminum nitrate, prior to sputtering with thin film magnetic coatings. The colloidal slurry is then cleaned from the substrate by the general cleaning mechanisms of mechanical scrubbing, dispersion and etching.

After cleaning, the substrates are sputtered with a series of layers, e.g., a chrome underlayer, a magnetic layer and a carbon protection layer. If residual slurry particles are left on the substrate or there is galling to the relatively soft NiP layer, the sputtered layers replicate the irregular surface morphology, creating a bumpy surface on the finished disk. When the read/write head glides over the surface, it crashes into bumps created by the residual particles and/or damage that is higher than the glide clearance. This is known as a glide defect, which can ultimately cause disk drive failure. These bumps further cause magnetic defects, corrosion and decreased disk life. Thus, the residual slurry particles and/or damage needs to be removed from the polished substrate surface so that the substrate is as smooth as possible.

Unfortunately, aluminum-based substrates have relatively low specific stiffness, as well as relatively low impact and dent resistance. For example, the relatively low specific stiffness of the Al/Mg—NiP substrates (typically 3.8 Mpsi/gm/cc) makes this type of disk substrate susceptible to environmental forces which create disk flutter and vibration and which may cause the read/write head to impact and dent the disk substrate surface.

More recently, glass substrates have been used for disk drives in portable devices, such as laptop computers. Glass substrates have a higher impact and dent resistance than aluminum-based substrates, which is important in portable devices where the unit is subject to being bumped, dropped and banged around, causing the read/write head to bang on the disk substrate surface. Moreover, the specific stiffness of glass or glass-ceramic substrates (typically $\leq 6$ or 7 Mpsi/gm/cc) is typically higher than that of aluminum-based substrates. As discussed in more detail below, glass substrates are typically strengthened by immersion in a strengthening melt. In the strengthening melt, an ion exchange process strengthens the glass substrate by exchanging smaller ions near the substrate surface for larger ions of the strengthening melt below the transformation temperature of the glass to generate pressure stress zones at the substrate surface.

An additional benefit of glass is that it is easier to polish to and maintain as a smooth surface finish (as compared to NiP) than aluminum-based substrates. A smoother substrate allows the read/write head to fly closer to the disk, which produces a higher density recording. Glide height for some computer disk drives is on the order of 20 nanometers (about 200 Å) and less, which is an extremely small interface distance. Thus, the fact that glass substrates can be polished to smoother finishes makes an industry shift from Al-based substrates to glass substrates desirable, not only for disk drives used in portable devices, but for disk drives used in stationary devices as well.

Just as with aluminum-based substrates, the surface of the glass substrate needs to be polished and superfinished with a slurry to provide an atomically smooth surface. Typically, the glass substrate is superfinished to a smooth finish with a colloidal slurry, e.g., a pH adjusted aqueous slurry containing colloidal silica and/or colloidal alumina particles and an etching agent such as cerium sulfate, prior to strengthening in a strengthening melt and sputtering with thin film magnetic coatings. In this superfinishing polish process, slurry particles attach to the surface being polished. Just as with aluminum-based substrates, if these particles are left in place on the glass substrate, glide defects occur that can ultimately cause disk drive failure. These glide defects further cause magnetic defects, corrosion and decreased disk life. Typically, polyvinyl alcohol (PVA) pad scrubbing, ultrasonics or megasonics are used to remove the slurry particles from the glass substrate. In addition, acid or base solutions may be used to etch the glass substrate or undercut the slurry particles.

However, even after the glass substrate has been successfully superfinished and cleaned, the surface uniformity of the glass substrate is not assured because subsequent immersion of the glass substrate in the strengthening melt can also present a surface uniformity problem. This problem can be especially troublesome with respect to low glide heights (typically ≦20 nanometers) and near contact recording. Strengthening melts, which are typically nitrates such as potassium nitrate and/or sodium nitrate, are subject to pH shift that can cause glass substrates strengthened therein to etch, creating angstrom size pits on the surface of the glass substrates. The pH shift can come from sources such as the thermal decomposition of the strengthening melt, the glass substrates themselves (typically, alkali glass), and/or incoming salts with high pH. Typically, the pH shift worsens with repeated use of the strengthening melt to treat more and more glass substrates. One conventional solution to the pH shift problem is to bubble sulfur dioxide gas through the strengthening melt. Unfortunately, the inventors have found that the sulfur dioxide gas solution is not effective because of particle formation, i.e., particles (e.g., sodium sulfite) fall out of the strengthening melt and contaminate the surface of the glass substrate. Another conventional solution to the pH shift problem is to add silicic acid ($SiO_2.nH_2O$) as diatomaceous earth to the strengthening melt. Like the sulfur dioxide gas solution, however, the inventors have found the diatomaceous earth/silicic acid solution is not effective because particles (e.g., sodium meta silicate) fall out of the strengthening melt and contaminate the surface of the glass substrate. The particle fall out and contamination problem associated with both these conventional solutions to the pH shift problem, i.e., the sulfer dioxide gas solution and the diatomaceous earth/silicic acid solution, has not been recognized in the art.

If the market trend toward glass substrates in disk drives is to succeed, an enhanced mechanism is required for controlling the pH shift in a strengthening melt for use in strengthening glass substrates. Preferably, such an enhanced mechanism would reduce pitting due by etching (as compared to not controlling the pH shift) but would not cause particle formation that can contaminate the surface of the glass substrate.

SUMMARY OF THE INVENTION

An object of the present invention is to provide an enhanced mechanism for controlling the pH shift in a strengthening melt for use in strengthening glass substrates.

Another object of the present invention is to provide such an enhanced mechanism that reduces pitting due by etching (as compared to not controlling the pH shift) and does not cause particle formation that can contaminate the surface of the glass substrate.

These and other objects of the present invention are achieved by a method of adjusting the pH of a strengthening melt for use in strengthening glass substrates, e.g., glass disk substrates for use in data storage devices. A non-particle-forming acid is added to the strengthening melt to lower the pH of the strengthening melt to ≦8. The acid is added while the strengthening melt is in a molten state and selected to avoid particle formation. Nitric acid, for example, is non-particle-forming with respect to nitrate based strengthening melts such as potassium nitrate and/or sodium nitrate. A base, e.g., sodium hydroxide, may be added if the pH of the strengthening melt falls below 5. Strengthening melts are subject to pH shift that can cause glass substrates strengthened therein to etch, creating pits on the substrate surface. Glass disk substrates treated in the pH adjusted strengthening melt are essentially free from such pits, as well as contamination caused by particle formation.

BRIEF DESCRIPTION OF THE DRAWINGS

The present invention together with the above and other objects and advantages can best be understood from the following detailed description of the embodiments of the invention illustrated in the drawings, wherein like reference numerals denote like elements.

DETAILED DESCRIPTION OF THE PREFERRED EMBODIMENTS

Overview

The present invention utilizes a non-particle-forming acid to adjust the pH of a strengthening melt for use in strengthening glass substrates, e.g., glass disk substrates for use in data storage devices. A non-particle-forming acid is added to the strengthening melt to lower the pH of the strengthening melt to ≦8. The acid is added while the strengthening melt is in a molten state and selected to avoid particle formation. Nitric acid, for example, is non-particle-forming with respect to nitrate based strengthening melts such as potassium nitrate and/or sodium nitrate. A base, e.g., sodium hydroxide, may be added if the pH of the strengthening melt falls below 5. Strengthening melts are subject to pH shift that can cause glass substrates strengthened therein to etch, creating pits on the substrate surface. Glass disk substrates treated in the pH adjusted strengthening melt are essentially free from such pits, as well as contamination caused by particle formation.

In an exemplary embodiment that is described in greater detail below, nitric acid was added to a strengthening melt comprising potassium nitrate and sodium nitrate to lower the pH from a shifted pH of 9.1 to an adjusted pH of 7.0. Superfinished aluminosilicate glass disk substrates treated in the pH shifted (pH=9.1) strengthening melt were pitted due to etching. In contrast, superfinished aluminosilicate glass disk substrates treated in the pH adjusted (pH=7.0) strengthening melt were essentially free from such pits, as well as contamination caused by particle formation as seen by atomic force microscope (AFM). Consequently, an improved data storage disk for use in a data storage device can be provided by applying a recording layer over the strengthened surface of the aluminosilicate glass disk substrate treated with the pH adjusted strengthening melt as compared to the pH shifted strengthening melt.

The Data Storage Device

Figure 1:
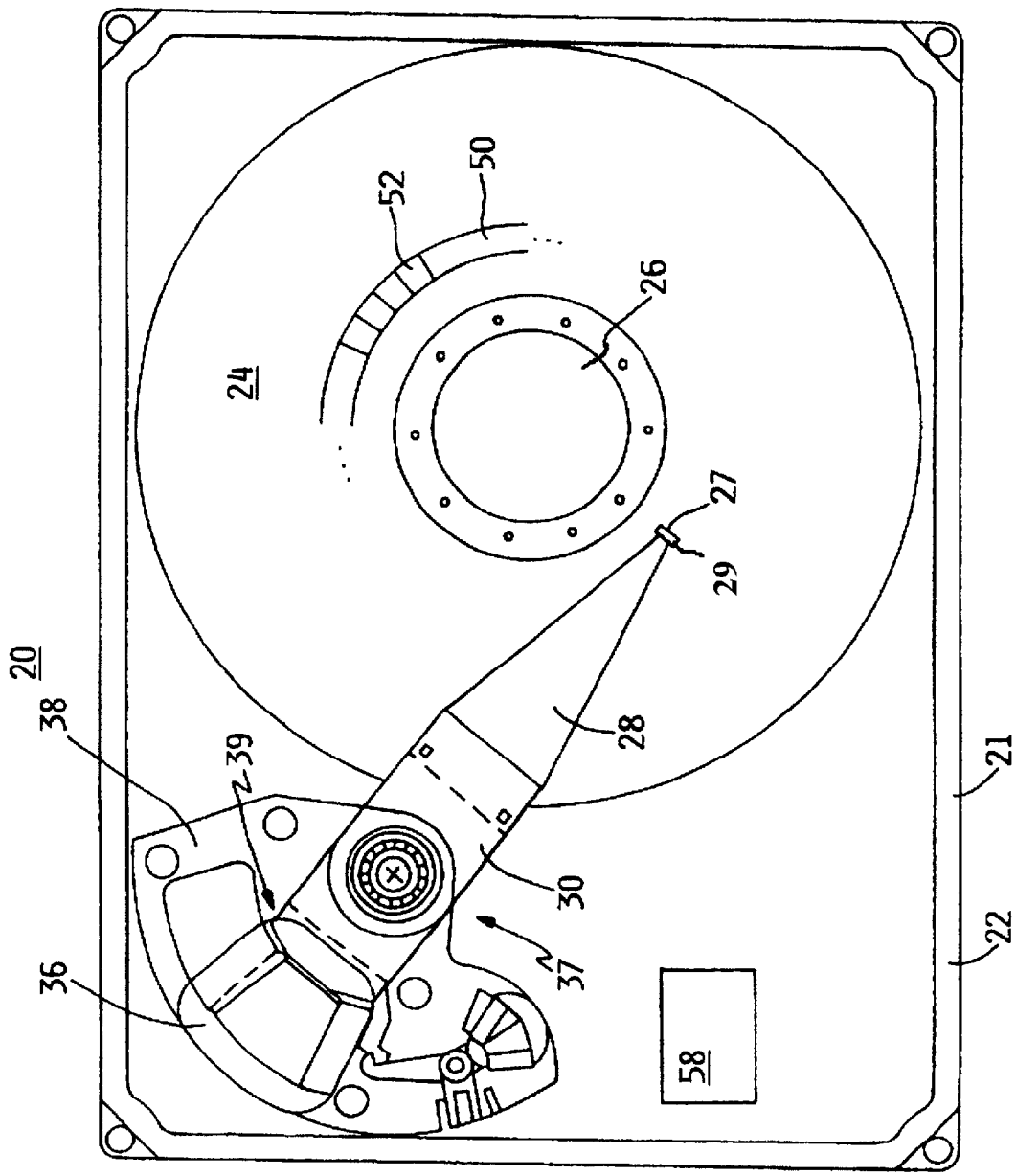
FIG. 1 is a top view of a data storage device with its upper housing cover removed and employing one or more data storage disks having glass disk substrates that have been treated with a pH adjusted strengthening melt in accordance with the present invention.
Figure 2:
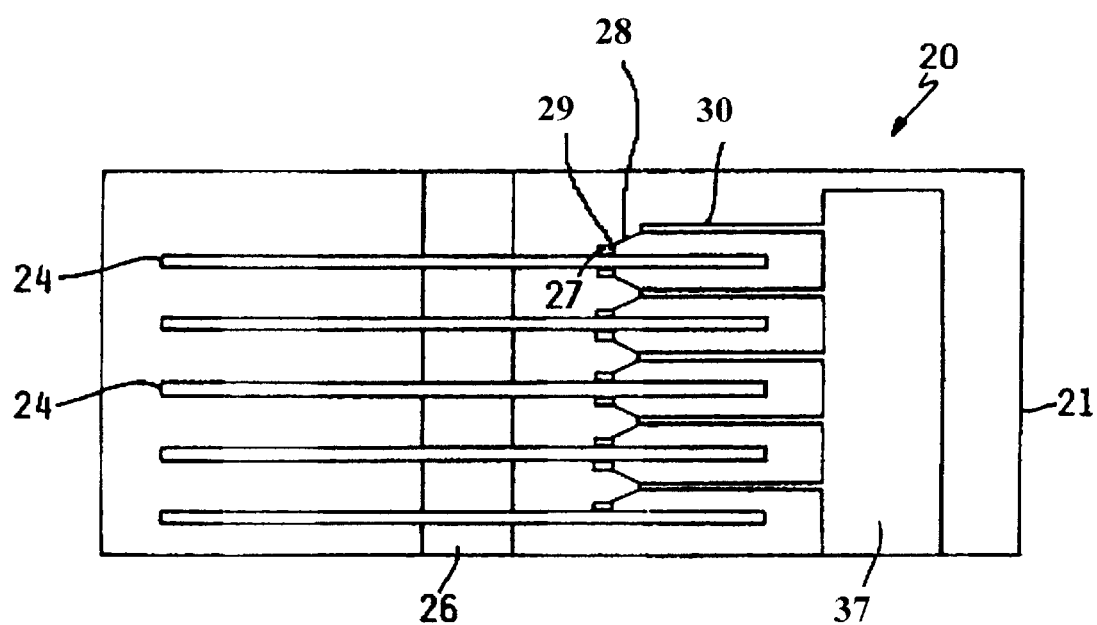
FIG. 2 is a side plan view of a data storage device comprising a plurality of data storage disks having glass disk substrates that have been treated with a pH adjusted strengthening melt in accordance with the present invention.

Referring now to the drawings, and more particularly to FIGS. 1 and 2, there is shown a magnetic data storage device 20 utilizing magnetic disks with disk substrates that have been treated using a pH adjusted strengthening melt in accordance with the preferred embodiment of the present invention. Magnetic data storage device 20 is shown in FIG. 1 with its cover (not shown) removed from a base 22 of a housing 21. As best seen in FIG. 2, the magnetic data storage device 20 includes one or more rigid data storage disks 24 that are rotated by a spindle motor 26. The rigid data storage disks 24 are constructed with a disk substrate upon which a recording layer is formed. In an exemplary construction, a magnetizable recording layer is formed on a glass disk substrate. Alternatively, an optical recording layer or a magneto-optical recording layer may be formed on the disk substrate in lieu of the magnetizable recording layer.

Referring back to FIG. 1, an actuator assembly 37 typically includes a plurality of interleaved actuator arms 30, with each arm having one or more suspensions 28 and transducers 27 mounted on airbearing sliders 29. The transducers 27 typically include components both for reading and writing information to and from the data storage disks 24. Each transducer 27 may be, for example, a magnetoresistive (MR) head having a write element and a MR read element. Alternatively, each transducer may be an inductive head having a combined read/write element or separate read and write elements, or an optical head having separate or combined read and write elements. The actuator assembly 37 includes a coil assembly 36 which cooperates with a permanent magnet structure 38 to operate as an actuator voice coil motor (VCM) 39 responsive to control signals produced by a controller 58. The controller 58 preferably includes control circuitry that coordinates the transfer of data to and from the data storage disks 24, and cooperates with the VCM 39 to move the actuator arms 30 and suspensions 28, to position transducers 27 to prescribed track 50 and sector 52 locations when reading and writing data from and to the data storage disks 24.

The Disk Substrate

Figure 3:
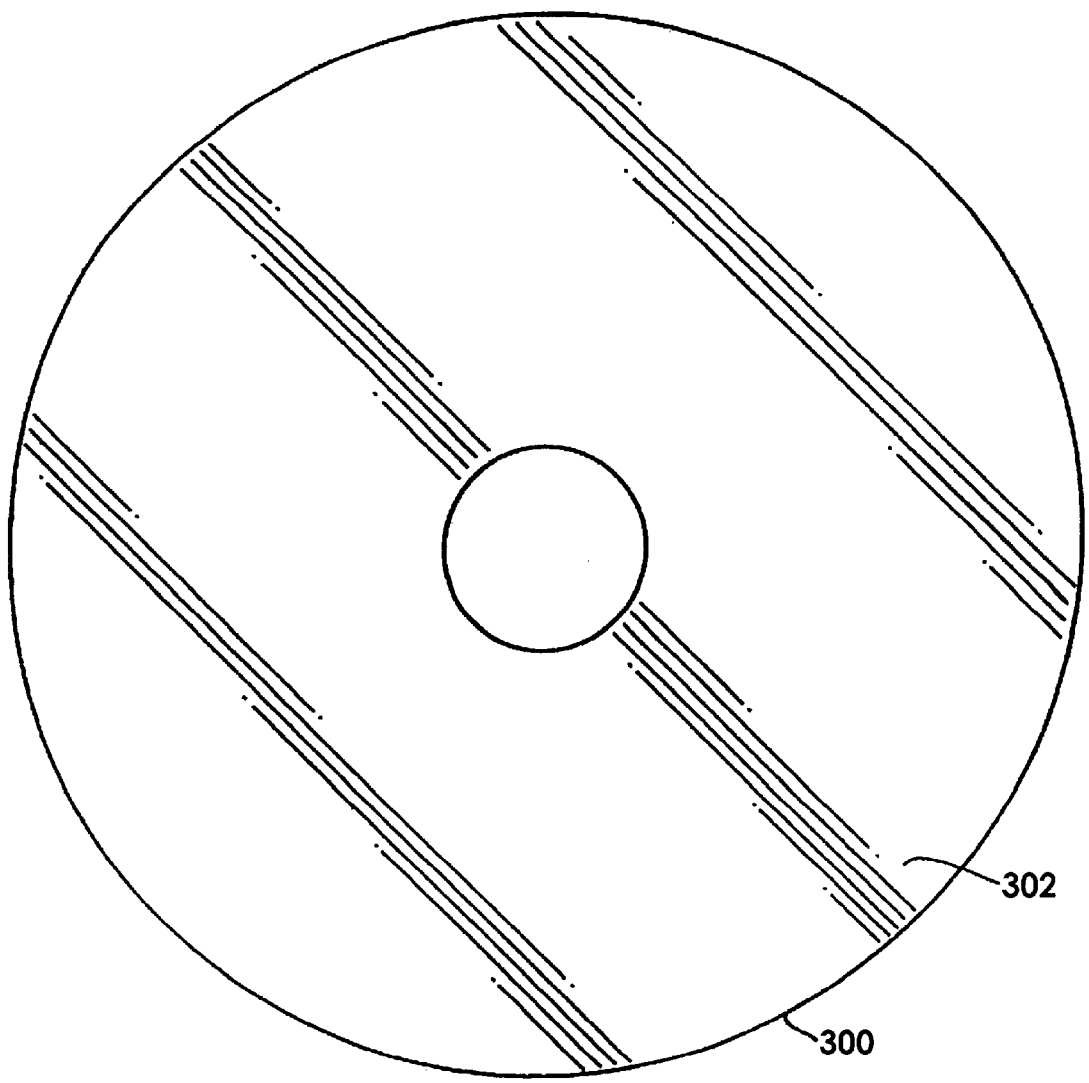
FIG. 3 is a perspective view of a disk substrate that has been treated with a pH adjusted strengthening melt in accordance with the present invention.

FIG. 3 shows a disk substrate that has been treated using a pH adjusted strengthening melt in accordance with the preferred embodiment of the present invention. Disk substrate 300, which has a disk substrate surface 302, is preferably a material having a relatively high specific stiffness (e.g., $\geq 3.8$ Mpsi/gm/cc) such as a glass or glass-ceramic. More preferably, the disk substrate 300 is an aluminosilicate glass. A common substrate material, e.g., aluminosilicate glass, has been chosen for the preferred embodiment to best illustrate the teachings of the present invention. However, it should be understood that the present invention is not limited to just aluminosilicate glass. Other glass-based substrate materials including other types of glass, such as silica soda lime glass, and glass-ceramics may be used. These glass-based substrates are hereinafter referred to as glass substrates.

A representative list of compositions along with their relative specific stiffnesses (Mpsi/gm/cc) that may be used is found in Table 1 below.

TABLE 1

| Specific | Material Stiffness |
|---|---|
| Aluminosilicate glass | 4.9 |
| Lithium silicate glass | 5.2 |
| Canasite glass ceramic | 4.6 |
| Flint glass ceramic | 6.6 |
| Quartz glass | 4.9–6.1 |

These materials may be used alone or in combination to provide the disk substrate of the appropriate stiffness. Preferably, the disk substrate has a stiffness of at least about 3.8 Mpsi/gm/cc.

Glass is generally a silicate material having a structure of silicon and oxygen where the silicon atom is tetrahedrally coordinated to surrounding oxygen atoms. Any number of materials may be used to form glass such as boron oxide, silicon oxide, germanium oxide, aluminum oxide, phosphorous oxide, vanadium oxide, arsenic oxide, antimony oxide, zirconium oxide, titanium oxide, aluminum oxide, thorium oxide, beryllium oxide, cadmium oxide, scandium oxide, lanthanum oxide, yttrium oxide, tin oxide, gallium oxide, indium oxide, lead oxide, magnesium oxide, lithium oxide, zinc oxide, barium oxide, calcium oxide, strontium oxide, sodium oxide, cadmium oxide, potassium oxide, rubidium oxide, mercury oxide, and cesium oxide.

Glass-ceramics may also be used for the disk substrate. Glass-ceramics generally result from the melt formation of glass and ceramic materials by conventional glass manufacturing techniques. Subsequently, the materials are heat cycled to cause crystallization. Typical glass-ceramics are, for example, $\beta$-quartz solid solution, $SiO_2$; $\beta$-quartz; lithium metasilicate, $Li_2O$—$SiO_2$; lithium disilicate, $Li_2(SiO_2)_2$; $\beta$-spodumene solid solution; anatase, $TiO_2$; $\beta$-spodumene solid solution; rutile $TiO_2$; $\beta$-spodumene solid solution; mullite, $3Al_2O_3$—$2SiO_2$; $\beta$-spodumene dorierite, $2MgO$—$2Al_2O_3$—$5SiO_2$; spinel, $MgO$—$Al_2O_3$; MgO-stuffed; $\beta$quartz; quartz; $SiO_2$; alpha-quartz solid solution, $SiO_2$; spinel, $MgO$—$Al_2O_3$; enstatite, $MgO$—$SiO_2$; fluorphlogopite solid solution, $KMg_3AlSi_3O_{10}F_2$; mullite, $3Al_2O_3$—$2SiO_2$; and $(Ba, Sr, Pb)Nb_2O_6$.

The disk substrate may be made entirely of one material, or may include a coating layer applied over at least one surface of an inner core.

Also, it should be understood that the present invention is not limited to disk substrates. The present invention is equally applicable to other applications that involve treatment of a glass substrate in strengthening melt. For example, the present invention may be utilized in applications such as lens fabrication and mirror fabrication.

Polishing and Superfinishing the Disk Substrate

Just as with aluminum-based substrates, the surface of the glass substrate needs to be polished and superfinished with a slurry to provide an atomically smooth surface. Typically, the glass substrate is superfinished to a smooth finish with a colloidal slurry, e.g., a pH adjusted aqueous slurry containing colloidal silica and/or colloidal alumina particles and an etching agent such as cerium sulfate, prior to strengthening in a strengthening melt and then sputtering with thin film magnetic coatings. In this superfinishing polish process, slurry particles attach to the surface being polished. Just as with aluminum-based substrates, if these particles are left in place on the glass substrate, glide defects occur that can ultimately cause disk drive failure. These glide defects further cause magnetic defects, corrosion and decreased disk life. Typically, polyvinyl alcohol (PVA) pad scrubbing, ultrasonics or megasonics are used to remove the slurry particles from the glass substrate. In addition, acid or base solutions may be used to etch the glass substrate or undercut the slurry particles. Any conventional polishing and superfinishing processes and slurry particle removal techniques may be used to prepare the disk substrate for immersion in the strengthening melt (and/or subsequent to immersion in the strengthening melt), and the present invention is neither limited to the superfinishing processes and cleaning techniques discussed above nor the sequence of those methods and techniques relative to immersion of the glass substrate in the strengthening melt.

Treatment of the Disk Substrate in the Strengthening Melt

Even after the glass substrate has been successfully superfinished and cleaned, the surface uniformity of the glass substrate is not assured because subsequent immersion of the glass substrate in a strengthening melt (sometimes referred to as a molten salt bath) can also present a surface uniformity problem. This problem can be especially troublesome with respect to low glide heights (typically ≤20 nanometers) and near contact recording. Strengthening melts, which are typically nitrates such as potassium nitrate ($KNO_3$) and/or sodium nitrate ($NaNO_3$), are subject to pH shift that can cause glass substrates strengthened therein to etch, creating angstrom size pits on the surface of the glass substrates. The pH shift can come from sources such as the thermal decomposition of the strengthening melt, the glass substrates themselves (typically, alkali glass), and/or incoming salts with high pH. Typically, the pH shift worsens with repeated use of the strengthening melt to treat more and more glass substrates. Examples of strengthening melts that may be used consistent with the present invention include $KNO_3/NaNO_3$, $KNO_3$, $NaNO_3$, $KNO_3/AgNO_3$, $NaNO_3/AgNO_3$, $K_2Cr_2O_7$ and other such conventional strengthening melts.

The present invention utilizes a non-particle-forming acid to adjust the pH of a strengthening melt for use in strengthening glass substrates, e.g., glass disk substrates for use in data storage devices. An appropriate amount of a non-particle-forming acid is added to the strengthening melt to lower the pH of the strengthening melt to within a predetermined pH range. The predetermined pH range is selected so that the acid will neutralize the salt and substantially eliminate etching. Typically, the predetermined pH range includes values above and below 7. The predetermined pH range of the strengthening melt is preferably 5 to 8, and more preferably 5.5 to 7.8. The acid is added while the strengthening melt is in a molten state (typically 280° C. to 420° C., and preferably 380° C.) and selected to avoid particle formation when added to the strengthening melt. Nitric acid, for example, is non-particle-forming with respect to nitrate based strengthening melts such as potassium nitrate and/or sodium nitrate. The present invention is not limited to the use of nitric acid as the non-particle-forming acid, however. Other non-particle-forming acids may be used in lieu of, or in addition to nitric acid. Useful non-particle-forming acids generally include mineral acids such as hydrochloric acid, chlorous acid, hypochlorous acid, perchloric acid, nitrous acid, and combinations thereof. In any event, the acid is selected to avoid particle formation when added to the strengthening melt.

An appropriate amount of a non-particle-forming base, e.g., sodium hydroxide, may be added if the pH of the strengthening melt falls below a predetermined lower pH limit. The lower pH limit is preferably 5, and more preferably 5.5. It may be necessary to add a base to the strengthening melt, for example, if too much acid may be added. The present invention is not limited to the use of sodium hydroxide as the non-particle-forming base, however. Other non-particle-forming bases may be used in lieu of, or in addition to sodium hydroxide. Useful non-particle-forming bases generally include inorganic bases such as lithium hydroxide, sodium hydroxide, potassium hydroxide, calcium hydroxide, ammonium hydroxide, and combinations thereof. In any event, the base is selected to avoid particle formation in the strengthening melt.

An advantage to using nitric acid ($HNO_3$) as the non-particle-forming acid and sodium hydroxide (NaOH) as the non-particle-forming base is that the neutralization products are potassium nitrate ($KNO_3$) and sodium nitrate ($NaNO_3$), which are typically constituents in the molten salt bath. Also, any other alkali species in the molten salt bath will be neutralized into ionic nitrate compounds, which typically comprise 100% of the molten salt bath. The neutralization products are generally classic acid/base salts—in this particular case, nitrated ionic compounds.

The appropriate amount of acid or base to be added to the strengthening melt is preferably determined based on the pH of the strengthening melt. Preferably, the appropriate amount of acid or base is added to maintain the pH of the strengthening melt in a predetermined pH range—preferably 5 to 8, and more preferably 5.5 to 7.8.

The pH of the strengthening melt may be determined using conventional techniques.

Because the strengthening melt is not an aqueous environment, its pH is typically not directly measured using a pH meter, for example. Instead, the pH of the strengthening melt may be determined using other conventional techniques such as by an indirect measure of the caustic material (e.g., sodium oxide, lithium oxide, potassium oxide and the like leached from the glass substrate) in the strengthening melt by titration against a reagent of known molarity. Such conventional techniques of pH determination are well known in the art, and thus are not further discussed herein.

Given the molten state of the strengthening melt as the acid or base is added, the addition preferably occurs slowly. For example, a metering pump may be used to control the rate at which the acid or base is added. A flow rate of less than 15 ml/min is desirable.

Table 2 below demonstrates pH adjustment by adding nitric acid ($HNO_3$) to a strengthening melt comprised of a 30 pound molten salt mixture (approximately 60/40) of potassium nitrate ($KNO_3$) and sodium nitrate ($NaNO_3$). The strengthening melt was initially at a shifted pH of 9.1 and was lowered to an adjusted pH of 6.5. The pH of the strengthening melt drops with subsequent nitric acid additions.

TABLE 2

| Amount of HNO3 Addition | pH of the Strengthening Melt |
| --- | --- |
| 0 ml | 9.10 |
| 1 ml | 8.83 |
| 2 ml | 8.33 |
| 3 ml | 6.65 |
| 4 ml | 6.44 |
| 5 ml | 6.50 |

The ability to raise the pH of the strengthening melt was also demonstrated by adding 1 gm of sodium hydroxide (NaOH) to a strengthening melt comprised of a 30 pound molten salt mixture (approximately 60/40) of potassium nitrate ($KNO_3$) and sodium nitrate ($NaNO_3$). In this case, the strengthening melt was at an initial pH of 8.77 and was raised to a pH of 10.5.

The pH of the strengthening melt may be determined on a periodic basis (e.g., after a predetermined number of glass substrates have been processed and/or after a predetermined period of time the strengthening melt has been heated), after a specific event (e.g., after a temperature excursion and/or after material is added to the strengthening melt).

Alternatively, the appropriate amount of acid or base to be added to the strengthening melt may be determined without actual determination of the pH of the strengthening melt. For example, the pH of the strengthening melt may be estimated (without an actual determination) based on criteria such as the number of glass substrates that have been processed and/or the period of time the strengthening melt has been heated.

Glass disk substrates are typically immersed in the pH adjusted strengthening melt for 1 hour to 5 hours, preferably about 1 hour. Glass disk substrates treated in the pH adjusted strengthening melt are essentially free from such pits, as well as contamination caused by particle formation.

EXAMPLE

Nitric acid ($HNO_3$) was added to a strengthening melt comprised of a 30,000 pound molten salt bath mixture of 60% potassium nitrate ($KNO_3$) and 40% sodium nitrate ($NaNO_3$) to lower the pH from a shifted pH of 9.1 to an adjusted pH of 7.0. About 3.5 liters of nitric acid was added at a rate of approximately 10 ml/min. Superfinished aluminosilicate glass disk substrates treated in the pH shifted (pH=9.1) strengthening melt were pitted due to etching. In contrast, superfinished aluminosilicate glass disk substrates treated in the pH adjusted (pH=7.0) strengthening melt were essentially free from such pits, as well as contamination caused by particle formation as seen by atomic force microscope (AFM). The aluminosilicate glass disk substrates strengthened in the pH shifted strengthening melt had surface roughness parameters of $R_{MS}$ ($R_q$)=0.699 nm and $R_{Max}$=14.940 nm, while aluminosilicate glass disk substrates strengthened in the pH adjusted strengthening melt had improved surface roughness parameters of $R_{MS}$ ($R_q$)= 0.626 nm and $R_{Max}$=4.698 nm. Consequently, an improved data storage disk for use in a data storage device can be provided by applying a recording layer over the strengthened surface of the aluminosilicate glass disk substrate treated with the pH adjusted strengthening melt as compared to the pH shifted strengthening melt.

While this invention has been described with respect to the preferred and alternative embodiments, it will be understood by those skilled in the art that various changes in detail may be made therein without departing from the spirit, scope, and teaching of the invention. For example, the invention may be utilized in other data storage medium applications, such as in optical storage medium applications. Additionally, the invention may be utilized in applications other than data storage device applications, such as in lens fabrication applications, mirror fabrication applications or other applications that involve treating a glass substrate in a strengthening melt. Accordingly, the herein disclosed invention is to be limited only as specified in the following claims.

What is claimed is:

1. A method of strengthening glass disk substrates for use in storage devices, comprising the steps of:
   providing a strengthening melt;
   adding a non-particle-forming acid to the strengthening melt such that the pH of the strengthening melt is no greater than about 8, the acid being added to the strengthening melt while the strengthening melt is in a molten state and being selected to avoid particle formation when added to the strengthening melt;
   placing a glass disk substrate in the strengthening melt having the acid added thereto.

2. The method as recited in claim 1, wherein the strengthening melt is nitrate based and the acid is nitric acid.

3. The method as recited in claim 1, wherein the molten state is at a temperature between about 280° C. and 420° C.

4. The method as recited in claim 3, wherein the glass disk substrate is an aluminosilicate glass disk substrate.

5. The method as recited in claim 1, further comprising the steps of:
   determining the pH of the strengthening melt having the acid added thereto;
   adding a base to the strengthening melt if the pH is determined to be below about 5, the base being added while the strengthening melt is in the molten state.

6. The method as recited in claim 5, wherein the strengthening melt is nitrate based and the acid is nitric acid.

7. The method as recited in claim 6, wherein the strengthening melt comprises at least one of potassium nitrate and sodium nitrate, and the base is sodium hydroxide.

8. The method as recited in claim 1, wherein the step of adding the acid is repeated to maintain the strengthening melt at a pH no higher than about 8.

9. The method as recited in claim 5, wherein the step of adding the acid is repeated to maintain the strengthening melt at a pH no higher than about 8, and wherein the step of determining the pH and, if necessary, the step of adding the base, is repeated to maintain the strengthening melt at a pH no less than about 5.

10. The method as recited in claim 1, wherein the acid is added to the strengthening melt at a rate no greater than 15 ml/min.

11. A glass disk substrate strengthened using the method according to claim 1, wherein the glass disk substrate is an aluminosilicate glass disk substrate.

12. A method of adjusting the pH of a strengthening melt for use in strengthening glass substrates, comprising the steps of:
   providing a strengthening melt;
   adding a non-particle-forming acid to the strengthening melt such that the pH of the strengthening melt is no greater than about 8, the acid being added to the strengthening melt while the strengthening melt is in a molten state and being selected to avoid particle formation when added to the strengthening melt.

13. The method as recited in claim 12, wherein the strengthening melt is nitrate based and the acid is nitric acid.

14. The method as recited in claim 13, wherein the strengthening melt comprises at least one of potassium nitrate and sodium nitrate.

15. The method as recited in claim 12, further comprising the steps of:
   determining the pH of the strengthening melt having the acid added thereto;
   adding a base to the strengthening melt if the pH is determined to be below about 5, the base being added while the strengthening melt is in the molten state.

16. The method as recited in claim 15, wherein the strengthening melt is nitrate based and the acid is nitric acid.

17. The method as recited in claim 16, wherein the strengthening melt comprises at least one of potassium nitrate and sodium nitrate, and the base is sodium hydroxide.

18. A method of strengthening glass substrates, comprising the steps of:
   providing a strengthening melt;
   adding a non-particle-forming acid to the strengthening melt such that the pH of the strengthening melt is no greater than about 8, the acid being added to the strengthening melt while the strengthening melt is in a molten state and being selected to avoid particle formation when added to the strengthening melt;
   placing a glass substrate in the strengthening melt having the acid added thereto.

19. The method as recited in claim 18, wherein the strengthening melt is nitrate based and the acid is nitric acid.

20. The method as recited in claim 19, wherein the strengthening melt comprises at least one of potassium nitrate and sodium nitrate.

* * * * *